United States Patent [19]
Newbigging

[11] Patent Number: 5,471,893
[45] Date of Patent: Dec. 5, 1995

[54] DOWNSHIFT INHIBITOR

[75] Inventor: Ian M. Newbigging, Bolton, England

[73] Assignee: Eaton Corporation, Cleveland, Ohio

[21] Appl. No.: 160,636

[22] Filed: Dec. 2, 1993

[30]    Foreign Application Priority Data

Dec. 11, 1992 [GB]   United Kingdom ............... 9225890

[51] Int. Cl.$^6$ ................................................. F16H 59/00
[52] U.S. Cl. ........................... 74/335; 74/336 R; 74/477
[58] Field of Search ................................. 74/335, 336 R, 74/331, 473 R, 477, 483 R

[56]              References Cited

U.S. PATENT DOCUMENTS

| | | | |
|---|---|---|---|
| 4,275,612 | 6/1981 | Silvester | 74/473 |
| 4,502,346 | 3/1985 | Reynolds | 74/339 |
| 4,550,627 | 11/1985 | Lauer et al. | 74/475 |
| 4,676,115 | 6/1987 | Morscheck et al. | 74/339 |
| 4,788,889 | 12/1988 | Davis et al. | 74/335 |
| 4,920,815 | 5/1990 | Reynolds | 74/335 |
| 4,974,468 | 12/1990 | Reynolds et al. | 74/477 |
| 5,048,650 | 9/1991 | Takizawa | 477/92 X |

*Primary Examiner*—Charles A. Marmor
*Assistant Examiner*—Peter Kwon
*Attorney, Agent, or Firm*—Howard D. Gordon

[57]              ABSTRACT

A downshift control for a manually shifted transmission (10) is provided. The control senses vehicle ground speed (100) and compares same to predetermined maximum values (REF$_1$, REF$_2$) at which certain ratios are allowed to downshift engaged. If vehicle speed exceeds the reference (OS>REF), a blocking plunger (216) assumes a position (216B, 216C) wherein selection of the prohibited ratio(s) is automatically mechanically blocked.

7 Claims, 5 Drawing Sheets

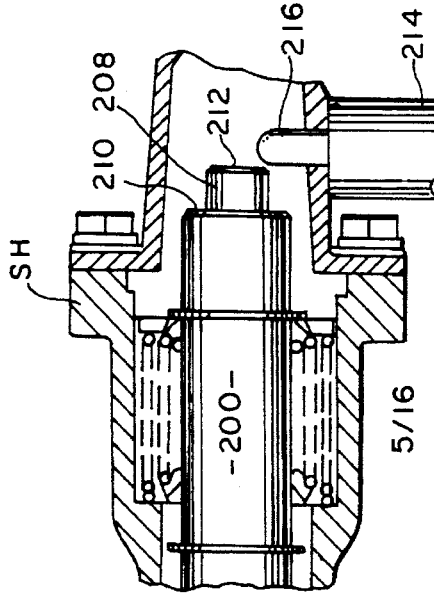
FIG. 5C
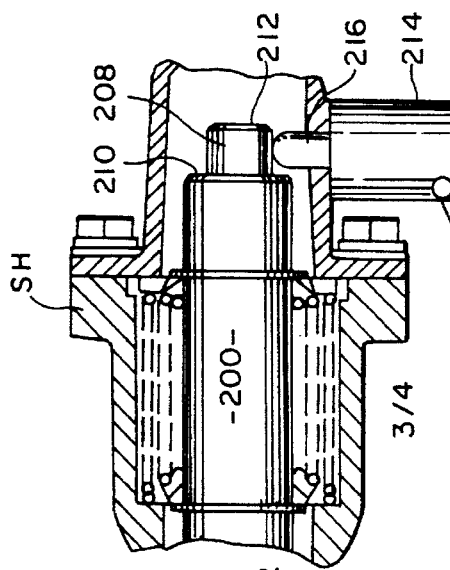
FIG. 5B
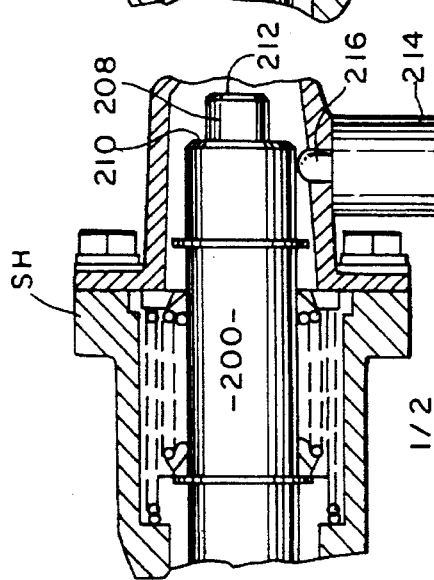
FIG. 5A
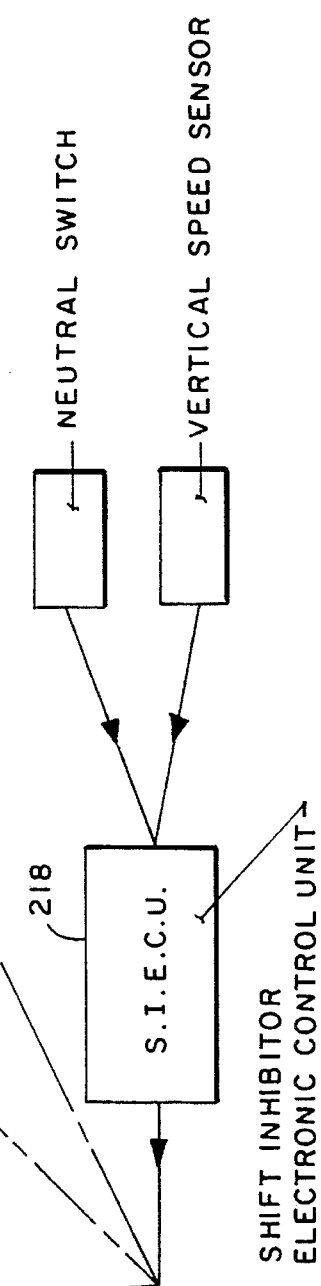

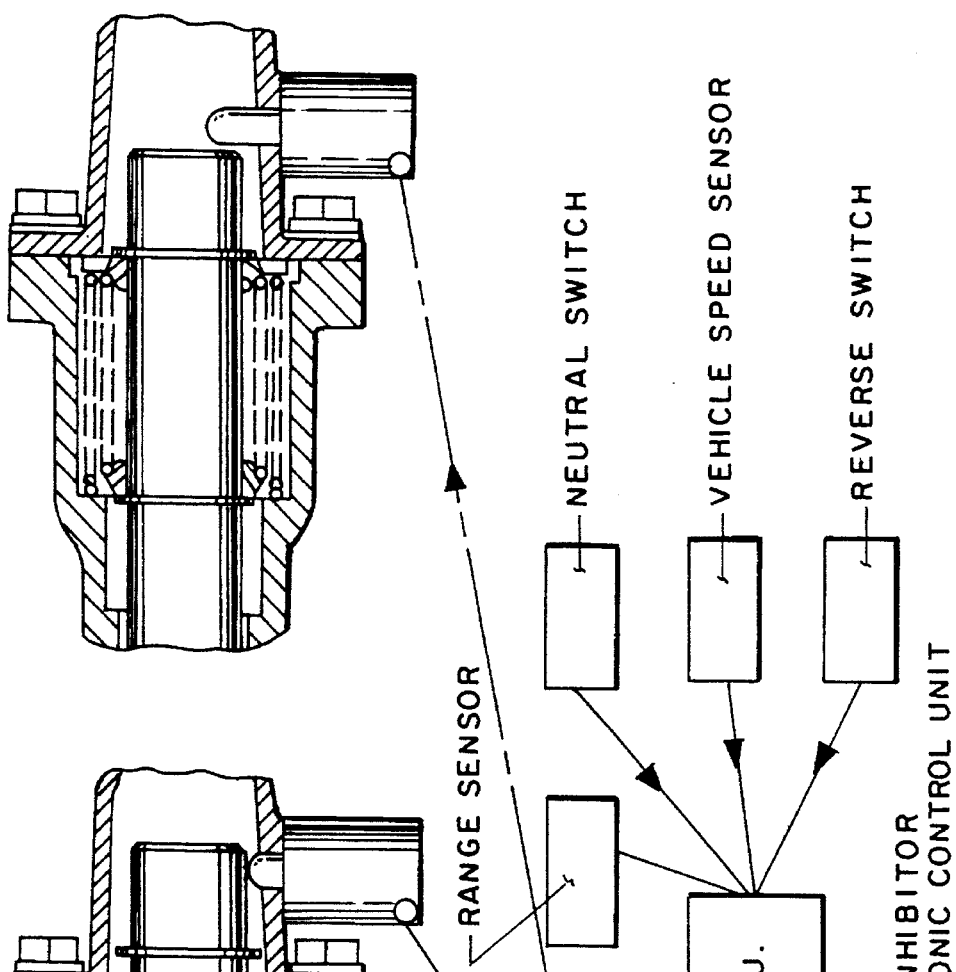
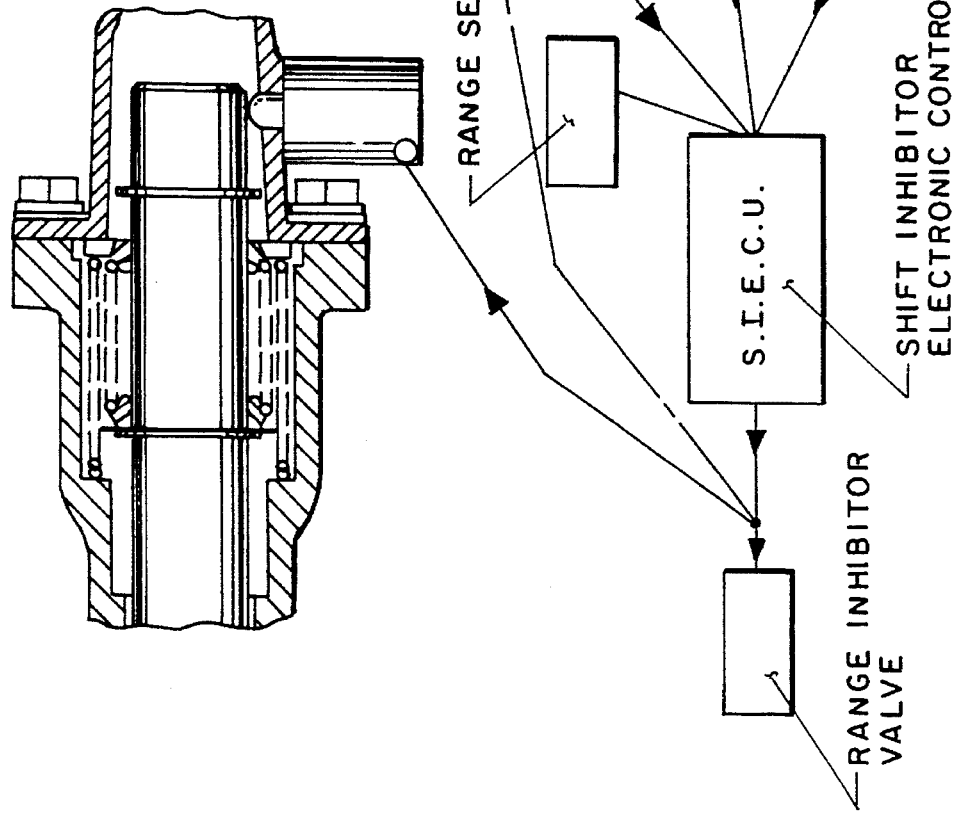

DOWNSHIFT INHIBITOR

RELATED APPLICATIONS

This application claims priority from GB 9225890.4, titled "DOWN-SHIFT INHIBITOR," filed Dec. 11, 1992, and assigned to the same assignee, Eaton Corporation, as is this application.

BACKGROUND OF THE INVENTION

1. Field of the Invention

The present invention relates to a control device/method for prohibiting downshifting of a vehicular manually shifted simple transmission, or the mainsection of a compound transmission, when an attempted shift into or a shift into the inhibited ratio(s) would result in unacceptable conditions such as probable excessive synchronous wear or burn-out and/or overspeeding of the vehicle engine.

More particularly, the present invention relates to a control for simple or compound manually shifted vehicular transmissions, particularly synchronized transmissions, which will prohibit or inhibit shift lever selection of a ratio or ratios which, under sensed vehicle conditions, such as vehicle speed, if engaged or attempted to be engaged, will result in unacceptable conditions such as excessive synchronizer wear, synchronizer burn-out and/or engine overspeeding.

2. Description of the Prior Art

Prior art devices exist for warning against and/or prohibiting or inhibiting operator attempts to manually engage a transmission ratio which, if engaged, will overspeed the engine and/or have other undesirable results. Such devices typically involve warning devices which provide a visual and/or audible warning if an attempt is made to engage an unacceptable ratio or inhibit fuel to the engine to govern/reduce vehicle speed.

The prior art devices were not totally satisfactory, as the vehicle operator may not react properly or rapidly enough to the alarm and/or the decrease in fueling may not result in a sufficiently rapid manner to prevent the undesirable consequences of engaging or attempting to engage an unacceptable transmission ratio.

In a heavy duty manually shifted synchronized transmission utilizing effective, powerful synchronizers, the synchronizers themselves, by virtue of being well designed and capable of bringing jaw clutch members and related components quickly to synchronous speed, are open to driver abuse, which often leads to damage or premature wear/failure of the synchronizers and/or damage to the vehicle power train, such as the engine.

SUMMARY OF THE INVENTION

In accordance with the present invention, the drawbacks of the prior art are overcome or minimized by a control for a manually controlled vehicular transmission which is responsive to vehicle operating conditions, such as vehicle speed, to mechanically block the transmission shifting mechanism from assuming a position for selection of a ratio predetermined as unacceptable at currently sensed vehicle conditions.

By way of example, in a typical simple 6-speed manual transmission, the shift lever is shifted in the "Y—Y" direction to select one of the reverse shift rail/fork, the first/second shift rail/fork, the third/fourth shift rail/fork or the fifth/sixth shift rail/fork, and in the "X—X" direction to cause engagement or disengagement of a particular ratio, see U.S. Pat. Nos. 4,550,627; 4,567,785 and 4,640,145, the disclosures of which are incorporated herein by reference. To prevent shifting or attempting to shift into a ratio predetermined as inappropriate for the currently sensed vehicle speed, vehicle speed (usually output shaft speed, OS) will be sensed and compared to a first reference value and to a second reference value smaller than the first reference value. If the vehicle speed is greater than the first reference value ($OS > REF_1 > REF_2$), blocking means will mechanically prevent or inhibit selection of either the first/second shift rail/fork or the third/fourth shift rail/fork, and if vehicle speed is greater than the second reference value but less than the first reference value ($REF_1 > OS > REF_2$), the blocking means will mechanically prevent or inhibit selection of the first/second shift rail/fork but not of the third/fourth shift rail/fork. Similar controls are applicable for the mainsections of manually shifted compound transmissions.

In a preferred structural embodiment of the present invention, a member such as a cross-shaft or a shift shaft having a unique axial or rotational position for each selection position is provided with slots or shoulders which will interact with interlock plunger means (preferably a single 3-position plunger) to permit or inhibit downshift selection movement of the member. Preferably, the plunger will be a multiple-position, solenoid-controlled device being rapidly responsive to actuation, i.e., of low inertia.

Accordingly, it is an object of the present invention to provide a control for a manually operated transmission which will automatically mechanically inhibit attempted downshifts into ratios predetermined to be inappropriate under current vehicle operating conditions.

This and other objects and advantages of the present invention will become apparent from a reading of the detailed description of the preferred embodiment taken in connection with the attached drawings.

BRIEF DESCRIPTION OF THE DRAWINGS

FIGS. 5A–5C illustrate an assembly similar to that illustrated in FIG. 3 in the three positions of the blocking means of the present invention.

FIGS. 6A–6B are similar to FIGS. 5A–5C, illustrating the present invention as applied to a (4+1)×(2) 9-speed range-type compound transmission.

DESCRIPTION OF THE PREFERRED EMBODIMENT

Figure 1:
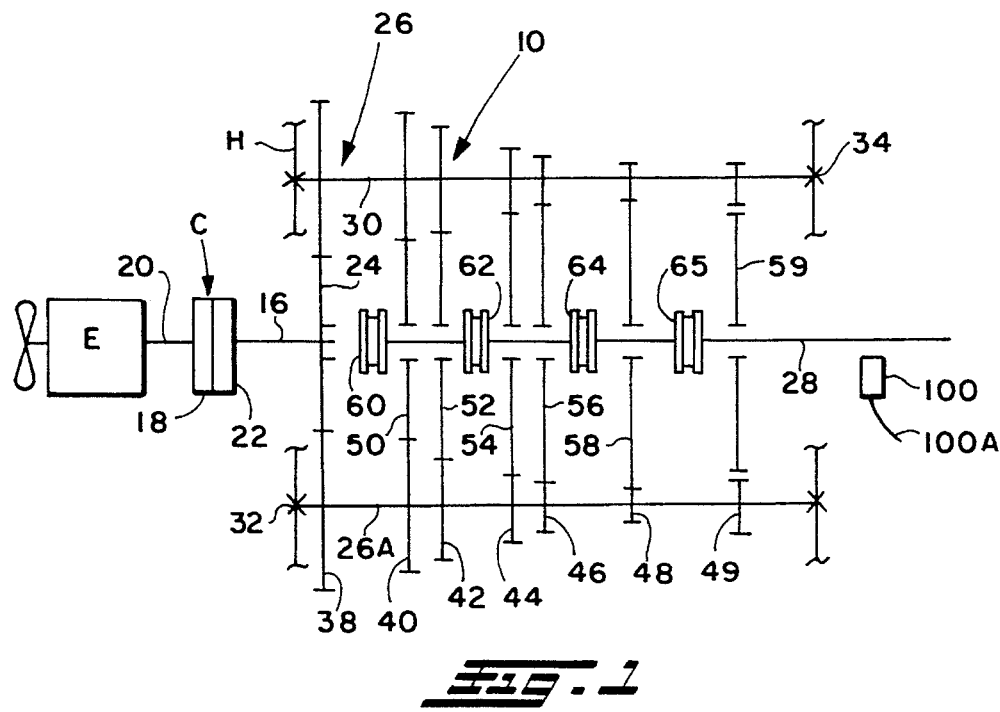
FIG. 1 is a schematic illustration of a synchronized 6-forward-speed vehicular transmission.
Figure 1A:
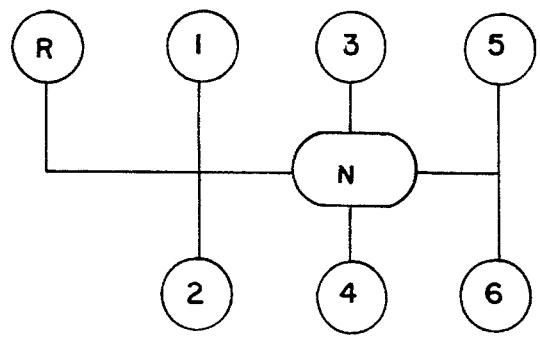
FIG. 1A is a schematic illustration of an H-type shift patter for the transmission of FIG. 1.

Certain terminology will be used in the following description for convenience in reference only and will not be limiting. The words "upwardly", "downwardly", "rightwardly", and "leftwardly" will designate directions in the drawings to which reference will be made. The words "forward" and "rearward", will refer, respectively, to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and a relatively large capacity friction means are utilized with the clutch members and are sufficient, upon initiation of a clutch engagement, to cause the clutch members and all members rotating therewith to rotate and substantially synchronous speed.

A manually controlled, 6-forward-speed, synchronized vehicular transmission 10 is illustrated in FIG. 1. Synchronized transmissions and the synchronized jaw clutches utilized therewith are well known in the prior art, as may be seen by reference to U.S. Pat. Nos. 4,373,403; 4,428,469; 4,989,706 and 5,111,922, the disclosures of which are incorporated herein by reference.

Transmission 10 is housed within a housing or case H and includes an input shaft 16 driven by a prime mover such as diesel engine E through a normally engaged, selectively disengaged master clutch C having an input section 18 connected to engine crank shaft 20 and an output section 22 for connection to the transmission input shaft 16.

Input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46, 48 and 49, fixed for rotation therewith. A plurality of mainshaft gears 50, 52, 54, 56, 58 and 59 surround the mainshaft 28 and are selectively clutchable, one at a time, to the mainshaft 28 for rotation therewith by double-acting synchronized jaw clutch assemblies 60, 62 and 64 and jaw clutch 65, as is well known in the prior art. Synchronized jaw clutch 60 may also be utilized to clutch input gear 24 to mainshaft 28 to provide a direct drive relationship between input shaft 16 and mainshaft 28. Mainshaft 28 defines the output shaft of transmission 10 and is in driving relation with the vehicle drive wheels by transfer cases and/or drive axles, as is well known in the prior art.

Although transmission 10 is illustrated as a twin countershaft construction, the present invention is equally applicable to transmissions of the single-layshaft type.

Figure 3:
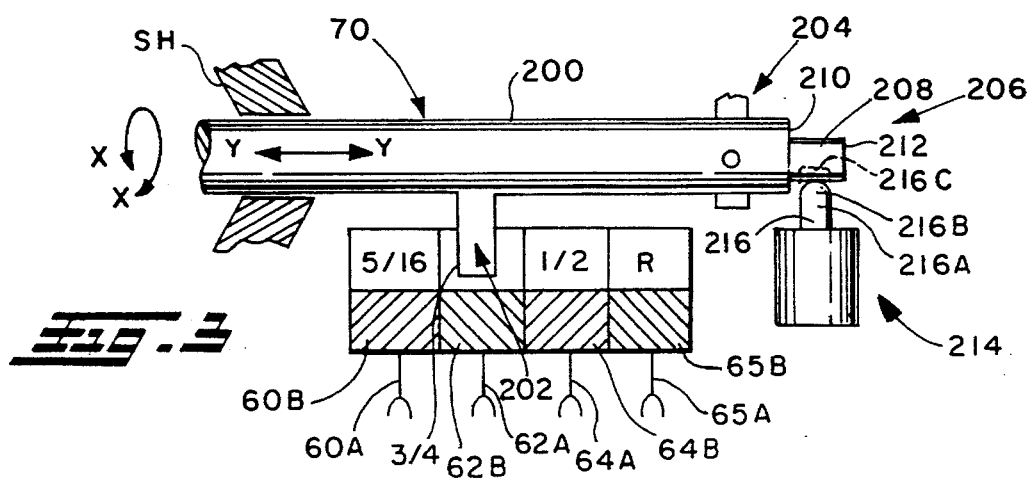
FIG. 3 is a schematic illustration of the control mechanism of the present invention as utilized with a cross-shaft-type shifting mechanism wherein the cross-shaft has a unique axial position for each shift rail selection.

Typically, synchronized jaw clutches 60, 62 and 64 and jaw clutch collar 65 are axially positioned by means of shift jaw clutch forks 60A, 62A, 64A and 65A, respectively, as symbolically illustrated in FIG. 3 and associated with the manually controlled shift bar housing assembly 70, as is well known in the prior art.

Mainshaft gear 59 is the reverse gear and is in continuous meshing engagement with countershaft gears 49 by means of conventional intermediate idler gears (not shown).

Synchronized jaw clutches 60, 62, and 64 are 3-position clutches in that they may be positioned in the centered, nonengaged position as illustrated, or in a fully rightwardly engaged or fully leftwardly engaged position by means of a shift lever. As is well known, only one of the clutches 60, 62, 64 and 65 is engageable at a given time and interlock means (not shown) are provided to lock the other clutches in the neutral condition.

Transmission 10 is provided with a rotational speed sensor 100 for sensing the rotational speed of mainshaft/output shaft 90 and for providing an output signal 100A indicative thereof. As is well known, output shaft speed (OS) is an indication of vehicle ground speed. As is also well known, for a given engaged ratio and a fully engaged master clutch, OS*GR=IS=ES where GR is gear ratio, IS is input shaft speed, and ES is engine speed. Thus, for a given vehicle speed (OS) and gear ratio (GR), the expected engine speed at master clutch full (not slipping) engagement may be determined. As is also well known, engaging lower speed ratios (high numerical gear reductions between input shaft and output shaft) at relatively high vehicle speeds may be damaging to the engine, master clutch and/or synchronized jaw clutch associated with the engaging ratio.

FIG. 3 schematically illustrates a portion of a shift bar housing assembly 70 for transmission 10. Briefly, axially movable shift rails or bars 60B, 62B, 64B and 65B, respectively, carry shift forks 60A, 62A, 64A and 65A, respectively, for controlling the clutches 60, 62, 64 and 65, respectively. Shift bar housings of this type are well known in the prior art, as may be seen by reference to U.S. Pat. Nos. 4,567,785; 4,584,895 and 4,873,881, the disclosures of which are incorporated herein by reference. Shift rail 60B is the fifth/sixth shift rail; shift rail 62B is the third/fourth shift rail; shift rail 64B is the first/second shift rail, and shift rail 65B is the reverse shift rail.

A cross-shaft 200 carrying a shift finger 202 is axially movable in the "Y—Y" direction for selection of a rail and rotatable to move the selected rail in the "X—X" direction for engaging and disengaging selected gear ratios. A clevis or crank connection 204 is provided for selectively, axially and rotationally moving the cross-shaft 200. Cross-shaft structures of this type may be seen in greater detail by reference to U.S. Pat. Nos. 4,502,346 and 4,275,612, the disclosures of which are incorporated herein by reference. Cross-shafts also may be positioned by pneumatic, hydraulic and/or solenoid actuators or associated with direct-shift mechanisms, as is illustrated in U.S. Pat. No. 4,550,627, the disclosure of which is incorporated herein by reference.

Referring to FIGS. 3 AND 5A–5C, the right-hand end 206 of cross-shaft 200 is provided with a reduced diameter extension 208 so that the cross-shaft has two different outer diameters defining a rightwardly facing intermediate surface or shoulder 210 and a rightwardly facing end face 212. As downshifts from fifth/sixth to third/fourth or first/second and downshifts from fifth/sixth or third/fourth to first/second, all require rightward axial movement of cross-shaft 200 relative to a shift bar housing (SH), the three forward-motion selection positions of cross-shaft 200 in housing SH for forward operation are shown in FIGS. 5A, 5B AND 5C. In FIG. 5A, shift finger 202 will engage the first/second rail; in FIG. 5B, shift finger 202 will engage the third/fourth rail, and in FIG. 5C, shift finger 202 will engage the fifth/sixth rail.

A blocking mechanism 214, such as a solenoid-controlled, 3-position plunger mechanism, is provided to selectively limit rightward movement of the cross-shaft 200. Blocking mechanism 214 has a plunger 216 having a fully retracted position 216A (see FIG. 5A), an intermediate extended position 216B (see FIG. 5B) and a fully extended position 216C (see FIG. 5C). Preferably, plunger 216 is biased to the fully retracted position 216A so that it will tend to failsafe to a non-blocking position. Three-position actuator devices are well known in the prior art, as may be seen by reference to U.S. Pat. Nos. 4,873,881; 4,899,607 and 4,936,156, the disclosures of which are incorporated herein by reference.

As seen in FIGS. 5A–5C, in the retracted position 216A of plunger 216, axial movement of cross-shaft 200 is not hindered. In intermediate extended position 216B, the plunger 216 will engage shoulder 212 to prevent rightward axial movement of cross-shaft 200 to select the first/second rail. In fully extended position 216C, the plunger 216 will engage end face 212 of cross-shaft 200 to prevent selection of both the third/fourth and the first/second shift rails.

Assuming a first reference value (above which fourth or lower gears should not be engaged) of 56 KPH (34 MPH) and a second reference value (above which second or first should gear should not be engaged) of 21 KPH (13 MPH), upon sensing a vehicle speed of less than 21 KPH, controller 218 will cause blocking means to assume the fully retracted plunger position of FIG. 5A. Upon sensing a vehicle speed greater than 21 KPH but less than 56 KPH, controller 218 will cause blocking means 214 to assume the intermediate plunger extension of FIG. 5B, and selection of downshifts into first or second speeds will be prevented. Upon sensing a vehicle speed of at least 56 KPH, controller 218 will cause mechanical blocking means 214 to assume the fully extended plunger position and selection of downshifts to fourth, third, second or first speeds will be prevented.

Figure 4:
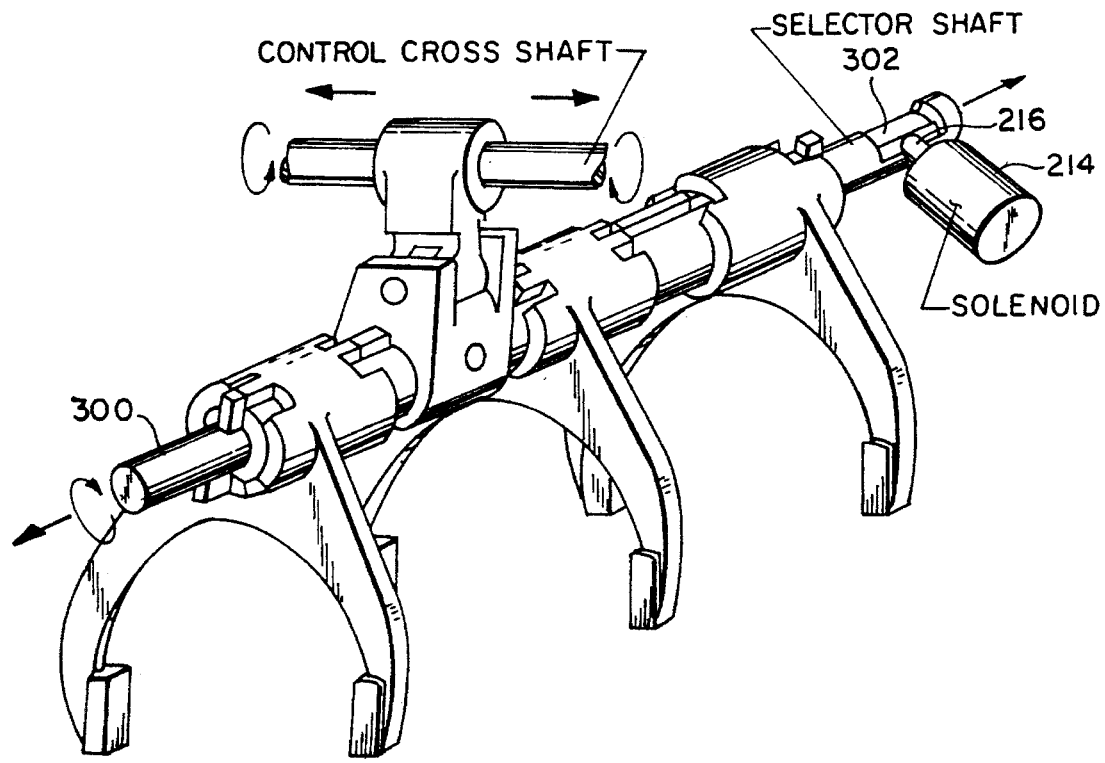
FIGS. 4–4C are schematic illustrations of the control mechanism of the present invention as utilized with a single-shift-shaft-type shifting mechanism wherein the shift shaft has a unique rotational position for each shift fork selection.
Figures 4A, 4B, 4C:
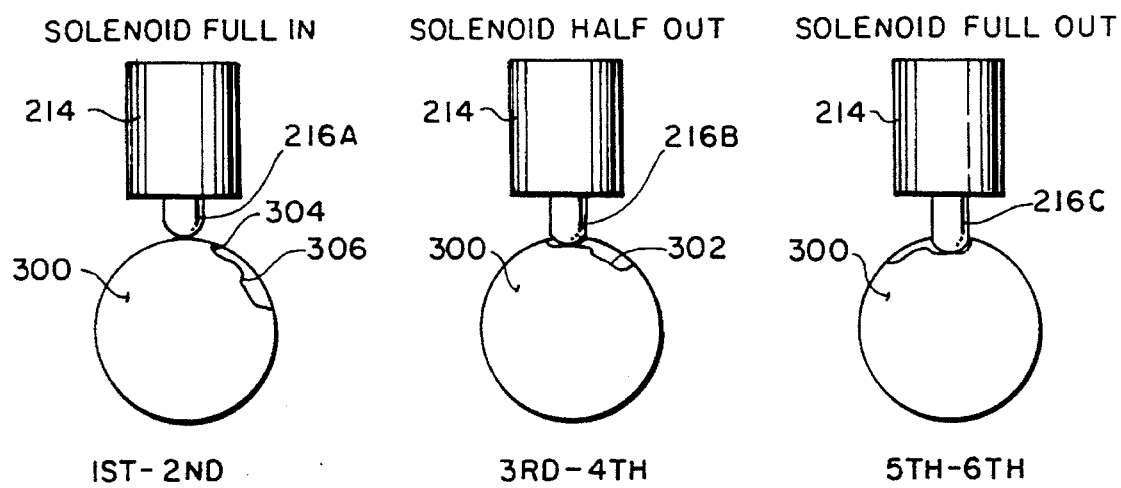

An alternate embodiment of shifting mechanism and downshift inhibiting device is illustrated in FIGS. 4–4C. In FIG. 4, a single shift shaft 300 is illustrated that has a unique rotational position for selection of each shift fork. As shown, the third/fourth shift fork is selected, counter-clockwise rotation will select the fifth/sixth shift fork, and clockwise rotation will select the first/second and then the reverse shift forks. Shift devices of this type are known in the prior art, as may be seen by reference to U.S. Pat. No. 4,920,815, the disclosure of which is incorporated herein by reference.

Shift shaft 300 is provided with a variable depth groove 302 defining clockwise-facing surfaces or shoulders 304 and 306, which correspond in function to shoulders 210 and 212 discussed above. In the fully extended position 216C (FIG. 4C), plunger 216 will engage shoulder 306 to prevent clockwise movement of shaft 300 to select to the fourth, third, second or first speed ratios. In the intermediate extended position 216B (FIG. 4B), plunger 216 will not engage shoulder 306 but will engage shoulder 304 to prevent clockwise rotation of shaft 300 sufficient to select the first or second speed ratios. Functionally, the assembly of FIGS. 4–4C is identical to the downshift inhibiting assembly of FIGS. 3 AND 5A–5C described above.

The present invention may also be utilized with a 2-position blocking mechanism wherein only one condition is sensed (i.e., OS>REF) and the cross-shaft or shift shaft has only a single face or shoulder for engagement by the plunger. Such a device will also be useful to prevent undesirable downshifts in the 4-speed mainsection of a compound transmission, see FIGS. 2–2B. A downshift inhibiting assembly utilizing a 2-position blocking mechanism is illustrated in FIGS. 6A AND 6B.

Figure 2:
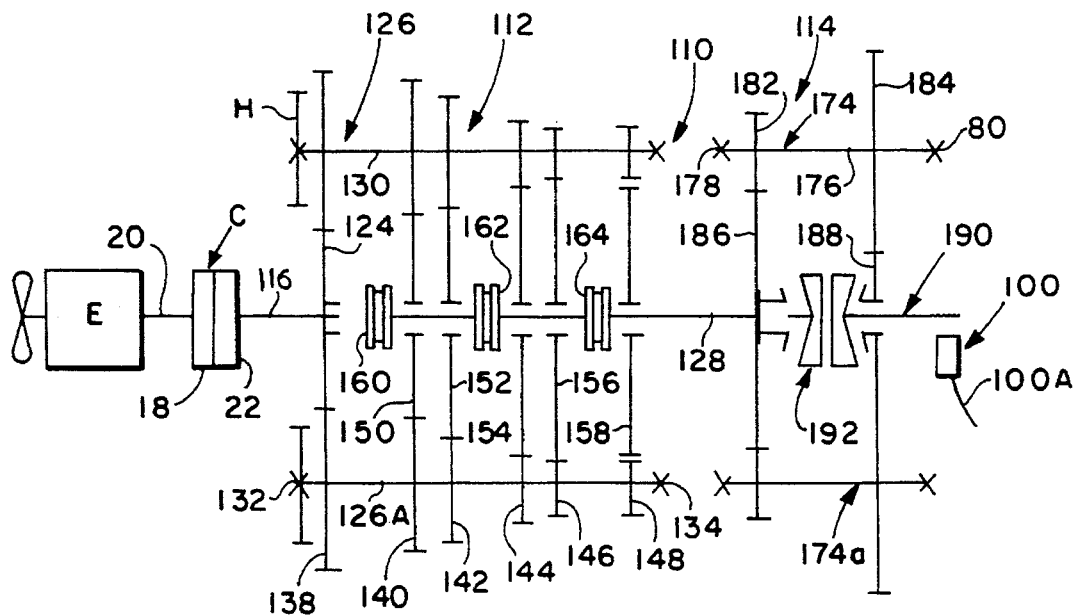
FIG. 2 is a schematic illustration of a compound transmission having a range-type auxiliary section and utilizing the automatic range shift control system of the present invention.
Figure 2A:
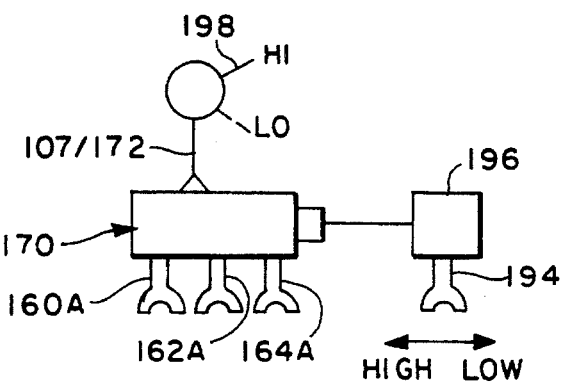
FIG. 2A is a schematic illustration of the prior art shifting mechanisms of the transmission of FIG. 2.
Figure 2B:
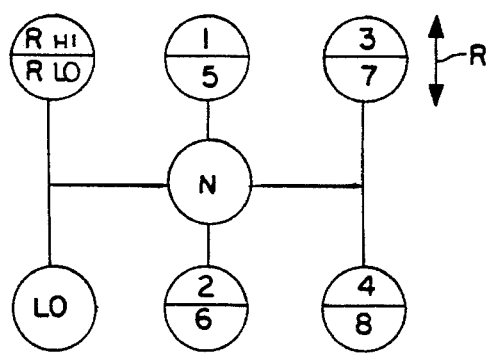
FIG. 2B is a schematic illustration of a repeat H-type shift pattern for the transmission of FIG. 2.

Referring to FIGS. 2, 2A AND 2B, in main transmission section 112, the input shaft 116 carries an input gear 124 for simultaneously driving a plurality of substantially identical countershaft assemblies 126 and 126A at substantially identical rotational speeds. The two substantially identical countershaft assemblies are provided on diametrically opposite sides of mainshaft 128 which is generally coaxially aligned with the input shaft 116. Each of the countershaft assemblies comprises a countershaft 130 supported by bearings 132 and 134 in housing H, only a portion of which is schematically illustrated. Each of the countershafts is provided with an identical grouping of countershaft gears 138, 140, 142, 144, 146 and 148, fixed for rotation therewith. A plurality of mainshaft gears 150, 152, 154, 156 and 158 surround the mainshaft 128 and are selectively clutchable, one at a time, to the mainshaft 128 for rotation therewith by sliding synchronized clutch collars 160, 162 and 164 as is well known in the prior art. Clutch collar 160 may also be utilized to clutch input gear 124 to mainshaft 128 to provide a direct drive relationship between input shaft 116 and mainshaft 128.

Typically, synchronized jaw clutch collars 160, 162 and 164 are axially positioned by means of shift forks 160A, 162A and 164A, respectively, associated with the manually controlled shift bar housing assembly 170, as well known in the prior art. Clutch collars 160, 162 and 164 may be of the well-known synchronized double-acting jaw clutch type.

Mainshaft gear 158 is the reverse gear and is in continuous meshing engagement with countershaft gears 148 by means of conventional intermediate idler gears (not shown). It should also be noted that while main transmission section 112 does provide five selectable forward speed ratios, the lowest forward speed ratio, namely that provided by drivingly connecting mainshaft drive gear 156 to mainshaft 128, is often of such a high gear reduction it has to be considered a low or "creeper" gear which is utilized only for starting of a vehicle under severe conditions and is not usually utilized in the high transmission range. Accordingly, while main transmission section 112 does provide five forward speeds, it is usually referred to as a "four plus one" main section as only four of the forward speeds are compounded by the auxiliary range transmission section 114 utilized therewith.

Synchronized jaw clutches 160, 162 and 164 are 3-position clutches in that they may be positioned in the centered, nonengaged position as illustrated, or in a fully rightwardly engaged or fully leftwardly engaged position by means of a shift lever 172. As is well known, only one of the clutches 160, 162 and 164 is engageable at a given time and main section interlock means (not shown) are provided to lock the other clutches in the neutral condition.

Auxiliary transmission range section 114 includes two substantially identical auxiliary countershaft assemblies 174 and 174A, each comprising an auxiliary countershaft 176 supported by bearings 178 and 180 in housing H and carrying two auxiliary section countershaft gears 182 and 184 for rotation therewith. Auxiliary countershaft gears 182 are constantly meshed with range/output gear 186 which is rotationally fixed to mainshaft 128 while auxiliary section countershaft gears 184 are constantly meshed with output gear 188.

A 2-position synchronized jaw clutch assembly 192, which is axially positioned by means of shift fork 194 and the range section shifting actuator assembly 196, is provided for clutching either gear 188 to output shaft 190 for low range operation or gear 186 to output shaft 190 for direct or high range operation of the compound transmission 110. The shift "repeat H" type pattern for compound range type transmission 110 is schematically illustrated in FIG. 2B.

Although the range type auxiliary section 114 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 160, 162 or 164 may be of the synchronized jaw clutch type and transmission sections 112 and/or 114 may be of the single countershaft type. Selection of low or high range operation of the transmission 110 is by means of an operator actuated switch or button 198 which was usually located at the shift lever 172.

Transmission 110 is provided with a rotational speed sensor 100 for sensing the rotational speed of output shaft, 190 and for providing an output signal 100A indicative thereof. As is well known, the rotational speed of output shaft 190 is indicative of the ground speed of the vehicle in which transmission 110 is installed.

It is known to arrange a range-change automatic inhibiting control device in a manual range-changing arrangement to inhibit range downshifts above a predetermined vehicle speed. Manual range shifting is typically by a pneumatic or electrical switch on a shift lever knob used for shifting the main transmission section within the ranges. As applied to the present invention, the reference speeds at which selection of the 1/5 and 2/6 rails is prohibited will vary with engaged range section ratio. For example, in the transmission of FIGS. 2–2B, the reference value in low range may be 17 KPH (11 MPH) and 61 KPH (38 MPH) in high range.

Accordingly, it may be seen that a new and improved control system for automatically controlling the downshifting of an otherwise manually shifted transmission or transmission section has been provided.

While the preferred embodiment of the present invention has been described with a certain degree of particularity, it is understood that various modifications, rearrangements and/or substitutions of the components thereof are possible without departing from the spirit and the scope of the invention as hereinafter claimed.

I claim:

1. A downshift control for a manually shifted, multiple-speed vehicular transmission having a first (first/second), a second (third/fourth) and a third (fifth/sixth) manually selectable ratio, said first ratio intended for lower vehicle ground speed operation than said second ratio, and said second ratio intended for lower vehicle ground speed operation than said third ratio, said first ratio having a first predetermined maximum vehicle ground speed at which downshift engagement thereof is allowed and said second ratio having a second predetermined maximum vehicle ground speed, greater than said first predetermined maximum vehicle ground speed, at which downshift engagement thereof is allowed, said transmission including a shift mechanism having a shaft manually movable in a selection direction (Y—Y) to a first position for selection of engaging and disengaging said first ratio, to a distinct second position for selection of engaging and disengaging said second ratio, and to a distinct third position for selection of engaging and disengaging said third ratio, said second position located intermediate to said first and third positions in said selection direction, said shaft movable in an engagement/disengagement direction (X—X), distinct from said selection direction, to cause engagement and disengagement of a selected ratio, said control characterized by:

control means for sensing a value (OS) indicative of current vehicle ground speed and for comparing said value indicative of current vehicle ground speed to a first reference value ($REF_1$) corresponding to said first predetermined maximum vehicle ground speed and to a second reference value ($REF_2$) corresponding to said second predetermined maximum vehicle ground speed, mechanical blocking means (216) responsive to control signals from said control means having (i) a non-blocking position (216A) when said value indicative of ground speed is less than said first reference value ($OS<REF_1<REF_2$) wherein said shaft is not blocked from movement between said first, second and third positions thereof in the selection direction; (ii) an intermediate blocking position (216B) for blocking movement of said shaft to said first position in said selection direction, but allowing movement of said shaft to said second position in said selection direction, if said value indicative of vehicle ground speed is greater than said first reference value but less than said second reference value ($REF_2>OS>REF_1$); and (iii) a fully blocking position (216C) for blocking movement of said shaft, both to said first and said second positions thereof, in said selection direction if said value indicative of vehicle ground speed is greater than said second reference value ($OS>REF_2>REF_1$).

2. The downshift control of claim 1 wherein said mechanical blocking means is biased to the non-blocking position thereof.

3. The downshift control of claim 1 wherein said shaft is axially movable along its axis in the selection direction.

4. The control of claim 3 wherein said shaft is rotatable about said axis as said mechanism is moved in the engagement/disengagement direction thereof.

5. The downshift control of claim 1 wherein said shaft is rotatably movable about its axis in the selection direction.

6. The control of claim 5 wherein said shaft is movable axially along said axis as said mechanism is moved in the engagement/disengagement direction thereof.

7. The control of claim 1 wherein said shaft defines a first shoulder and a second shoulder, said first shoulder further radially displaced from the axis of said shaft than said second shoulder, and said mechanical blocking mechanism includes a blocking plunger extending substantially radially inwardly toward the axis of said shaft, said non-blocking position comprising a retracted position of said plunger wherein said plunger is not engageable with said first or second shoulders, said intermediate blocking position comprising a partially extended position of said plunger wherein said first shoulder, but not said second shoulder, is engageable by said plunger and said fully blocking position comprising full extension of said plunger wherein said second shoulder is engageable by said plunger.

* * * * *